(12) United States Patent
Deiss

(10) Patent No.: US 8,360,767 B2
(45) Date of Patent: Jan. 29, 2013

(54) DEVICE FOR AVOIDING THE UNCONTROLLED DISCHARGE OF MELT FROM A NOZZLE PLATE

(75) Inventor: Stefan Deiss, Harxheim (DE)

(73) Assignee: Automatik Plastics Machinery GmbH, Grossostheim (DE)

( * ) Notice: Subject to any disclaimer, the term of this patent is extended or adjusted under 35 U.S.C. 154(b) by 262 days.

(21) Appl. No.: 12/954,500

(22) Filed: Nov. 24, 2010

(65) Prior Publication Data

US 2011/0123661 A1 May 26, 2011

(51) Int. Cl.
*B29C 47/08* (2006.01)
*B29C 37/00* (2006.01)
*B29B 17/00* (2006.01)

(52) U.S. Cl. ........ 425/215; 425/216; 425/217; 425/565; 425/566; 264/39

(58) Field of Classification Search .................. 425/215, 425/216, 217, 565, 566; 264/39
See application file for complete search history.

(56) References Cited

U.S. PATENT DOCUMENTS 5,478,227 A * 12/1995 Kuse ............................. 425/216

* cited by examiner

*Primary Examiner* — Yogendra Gupta
*Assistant Examiner* — Alison Hindenlang
(74) *Attorney, Agent, or Firm* — Buskop Law Group, PC; Wendy Buskop

(57) ABSTRACT

One or more embodiments of a device for avoiding the uncontrolled discharge of melt from nozzle apertures of a nozzle plate are provided. The device can include a locking member that is movable in front of the nozzle plate. The locking member can be formed as an extrudate collection member. The locking member can be reciprocable between a production position and a collection position. And melt can be discharged from the nozzle apertures of the nozzle plate in the form of extrudates into a process chamber when the locking member is in the production position and into extrudate collection member when the locking member is in the collection position. The device can also include a melt extraction aperture disposed on the extrudate collection member. The melt extraction aperture can be configured to align with the nozzle apertures in the nozzle plate and a melt extraction channel.

14 Claims, 5 Drawing Sheets

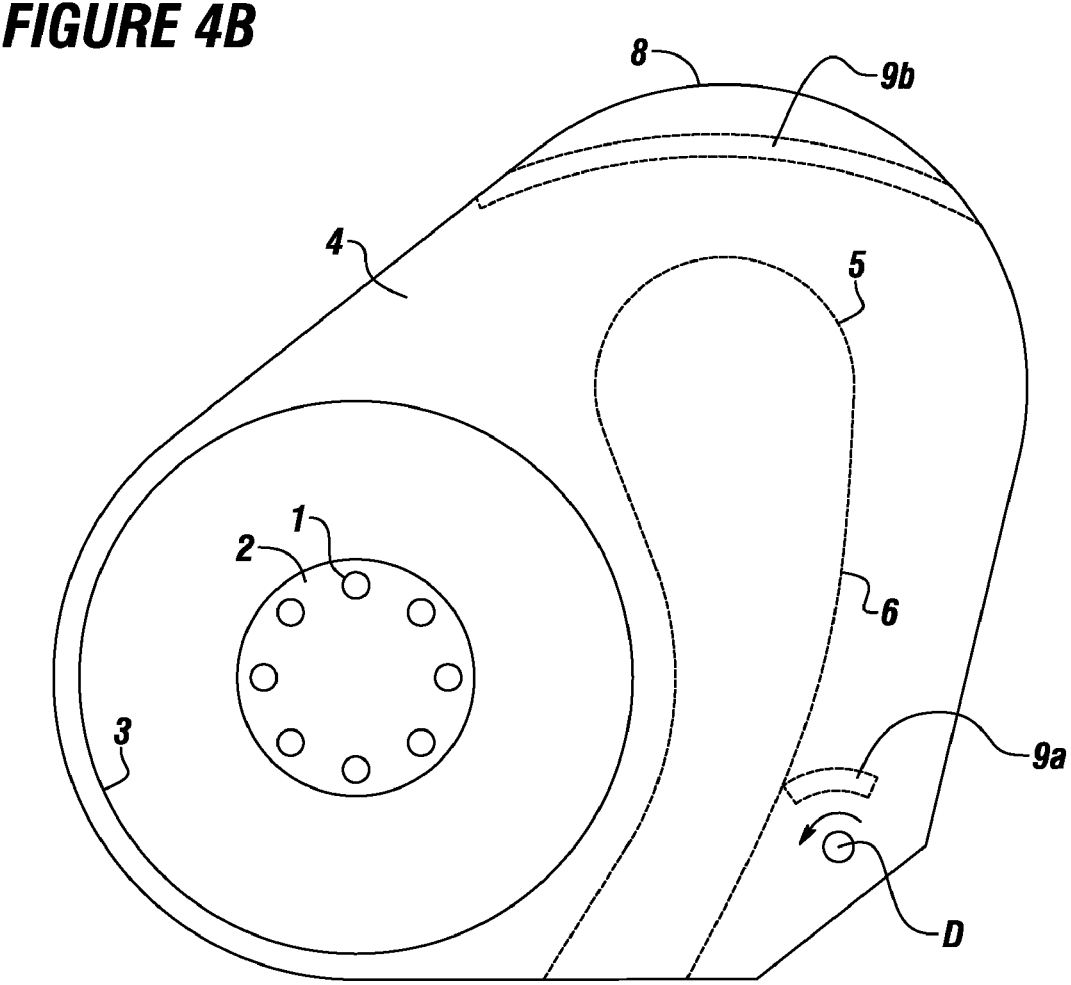

DEVICE FOR AVOIDING THE UNCONTROLLED DISCHARGE OF MELT FROM A NOZZLE PLATE

CROSS REFERENCE TO RELATED APPLICATIONS

The present patent application claims priority to and the benefit of co-pending German Patent Application No. DE 20 2009 016 055.6, which was filed Nov. 25, 2009, entitled "DEVICE FOR AVOIDING THE UNCONTROLLED DISCHARGE OF MELT FROM NOZZLE PLATE." This reference is incorporated in its entirety herein.

FIELD

The present embodiments generally relate to a device for avoiding the uncontrolled discharge of melt from nozzle apertures of a nozzle plate.

BACKGROUND

A need exists for a device that can prevent the uncontrolled discharge of melt, such as plastic melt, from nozzle apertures.

A further need exists for a device that can be used to ensure that melt does not enter a process chamber of an underwater granulator until the desired molten conditions, such as the necessary degree of plastication or melting of melt, are reached.

A further need exists for a device that controls the uncontrolled discharge of melt, is compact in design, and reduces thermal problems associated with the control of melt out of a nozzle.

The present embodiments meet these needs.

BRIEF DESCRIPTION OF THE DRAWINGS

The detailed description will be better understood in conjunction with the accompanying drawings as follows:

FIG. 4b shows a diagrammatic top view on the device of FIG. 4a in a production position.

Figure 1:
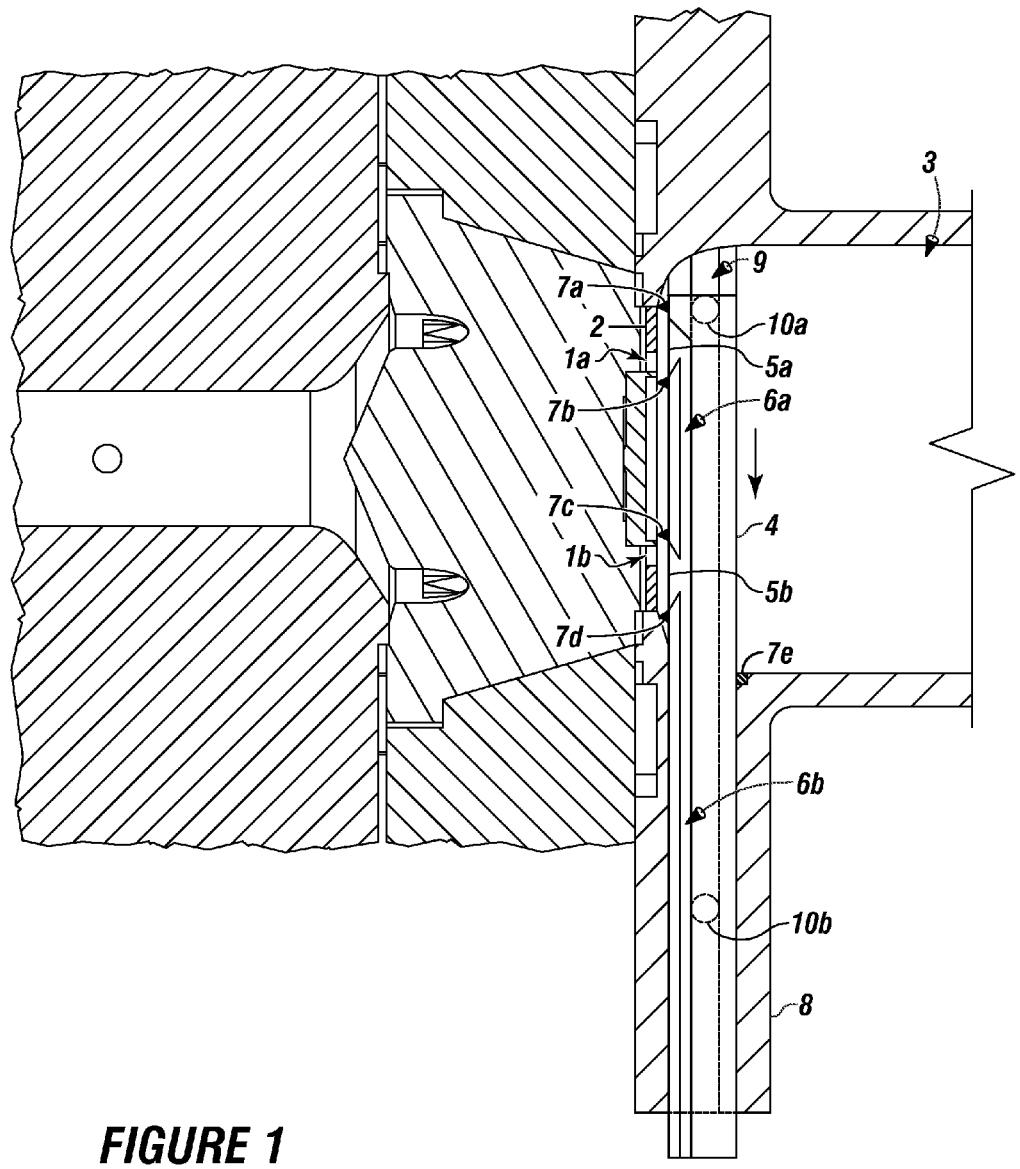
FIG. 1 depicts a diagrammatic sectional view of a part of an underwater granulation device comprising a device for avoiding the uncontrolled discharge of melt from a nozzle plate according to one or more embodiments.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments generally relate to a device that can prevent the uncontrolled discharge of melt, such as plastic melt, from nozzle apertures.

The device for avoiding the uncontrolled discharge of melt, such as plastic melt, from nozzle apertures of a nozzle plate in the form of extrudates into a process chamber by utilizing a locking member. The locking member can be movable. And the locking member can be in front of the nozzle plate.

The locking member can be formed as an extrudate collection member that is reciprocable between a production position, in which the melt is discharged unimpeded from the nozzle apertures of the nozzle plate in the form of extrudates into the process chamber, and a collection position according to which the melt is discharged from the nozzle apertures of the nozzle plate in the form of extrudates into the extrudate collection member.

The extrudate collection member can have one or more melt extraction apertures. The extraction apertures can be arranged in the extrudate collection member such that in the collection position they are aligned with the nozzle apertures in the nozzle plate and one or more melt extraction channels.

The melt extraction apertures can communicate with one or more melt extraction channels in the extrudate collection member. As such, a melt extraction outlet can be provided in front of several nozzle apertures, and the extrudates can be discharged via a common melt extraction channel. In one or more embodiments, a single melt extraction aperture with a corresponding melt extraction channel can be assigned to each nozzle aperture.

The extrudate collection member can be formed planar or flat. The device can provide control discharge of melt with a structurally simple and compact design. In addition, the device has minimal mass in the region of the process chamber in front of the nozzle plate. As such, thermal problems in the area of the melt supply to the nozzle plate, which occur with common start-up valves, can be avoided.

The extrudate discharge through the at least one melt extraction aperture and the at least one melt extraction channel, can minimize or eliminate clogging of the nozzle apertures in the nozzle plate, such as during the start-up process.

In addition, the device can allow for a reduction in the time required for operation equilibrium of the granulation plant because the extrudates already pass through the nozzle apertures of the nozzle plate during start-up of the granulation plant.

The extrudate collection member can be sealed against the process chamber and the nozzle plate by sealing members. Illustrative sealing members can include lip seals. The sealing members can be arranged in the area around single melt extraction outlets and/or single nozzle outlets separately. In one or more embodiments, the sealing members can be arranged around the exterior of all melt extraction outlets or around the at least one common melt extraction outlet and/or the nozzle apertures of the nozzle plate commonly in a sealing manner.

For example, the sealing members can be arranged in recesses in the nozzle plate or in the region surrounding the nozzle plate of the process chamber and/or in corresponding recesses in the extrudate collection member.

The sealing members can fulfill two functions, on the one hand, the sealing of the extrudate collection member against the nozzle plate and the nozzle apertures arranged therein, as well as the sealing against the process chamber. On the one hand, thereby, a sealing against the discharge of melt is to be achieved, on the other hand, a sealing against the process chamber which possibly comprises cooling fluid therein can be achieved. Therefore, a double-sided sealing can be effected, on the one hand, against the housing or the process chamber, respectively, and also against the nozzle plate with the nozzle apertures therein. The sealing members can be made of heat-resistant and flexible material, as, for example, polyimide.

The extrudate collecting member being reciprocable between the collection position and the production position can be formed as a slider element, which is supported translatory displaceable.

According to a further preferred embodiment of the invention, the extrudate collection member being reciprocable between the collection position and the production position can be formed as a rotary element which is supported pivotably around a rotation axis (D). Thereby, a movement results from a pivot movement of the extrudate collection member around the pivot axis thus defined. The pivot movement around the rotation axis (D) thereby offers an especially structurally simple an effective possibility to securely move the extrudate collection member into a defined collection position and a defined production position. If applicable, pivot abutments can be provided which define the corresponding positions during contact of the extrudate collection member. The rotation axis (D) can be provided in a part of the housing of the process chamber which is provided in a region surrounding the nozzle plate. The rotation axis (D) thereby is orientated such that the plane of the pivot movement runs parallel to the plane of the nozzle plate whereby, thus, also the extrudate collection member is movable parallel to the nozzle plate and is arranged in the collection position sealingly against the latter.

The guidance of the reciprocating movement of the extrudate collection member can be effected with respect to the defined positioning of the extrudate collection member such that at least a cam is provided and at least a cam channel is provided such that the at least one cam is supported movably in the at least one cam channel.

The at least one cam channel can be arranged in the region in which the at least one cam is displaced to the nozzle plate such that the extrudate collection member thereby is pressed in the collection position against the nozzle plate when the extrudate collection member is in the collection position.

The extrudate collection member can be supported by at least one cam and the at least one cam channel translatory displaceable and pivotable. And the cam guidance within the cam channel can offer a pressing movement into the collection position of the extrudate collection member against the nozzle plate. As such, a type of sliding guide of the extrudate collection member can be provided by the cam and cam channel.

The at least one cam channel can be orientated such that the plane of a straight pushing movement or a arc-shaped pivot movement of the extrudate collection member runs parallel to the plane of the nozzle plate. Accordingly, the extrudate collection member can be movable parallel to the nozzle plate and can be arranged adjacent to the latter in the collection position in a sealing manner.

The at least one cam channel can be formed straight such that a straight displacement direction of the extrudate collection member into the collection position or the production position, respectively, results structurally simple. Also, a curved or arc-shaped design of the at least one cam channel can be possible such that a pivot movement of the extrudate collection member into the collection position or into the production position, respectively, can result structurally simple.

The at least one cam can be fixed to the extrudate collection member, and the at least one cam channel is located in the region of the process chamber. The cam channel, can be located in the region of the process chamber or within the housing, respectively, of the process chamber, respectively, in a corresponding area there, arranged around the nozzle plate.

The at least one cam can also be fixed to the process chamber, and the at least one cam channel can be located in the region of the extrudate collection member.

The device can include two cam channels. One of the cam channels can support one or more cams and the other cam channel can support one or more cams. The cams can be supported in the respective cam channel movably. For example, the extrudate collection member can have four cams with correspondingly four regions of cam channels being displaced, respectively two in each of the preferably provided two cam channels.

In one or more embodiments, the extrudate collection member can have three cams with correspondingly three regions of cam channels being displaced, respectively two in one of the cam channels and one in the other cam channel. This can provide a uniform pressing and a uniform guidance of the extrudate collection members in a structurally simple manner. And the danger of a possible twisting during the reciprocating movement can be eliminated or minimized.

Two cam channels can be provided at two locations of a correspondingly designed extrudate collection member. The extrudate collection member can be guided in both channels respectively lateral. Respective abutments can be provided in a region of at least one or both, respectively, cam channels which respectively define the collection position and the production position of the extrudate collection member.

To improve the sealing of the extrudate collection member, such as, against the process chamber or the housing of the process chamber, respectively, however, also against the nozzle plate, the extrudate collection member can have an outline designed such that the latter in the production position corresponds to the outline of the surrounding process chamber and seals the latter. This can enable aerodynamic guidance of a cooling fluid in the process chamber when the extrudate collection member is located in the production position, because then, the latter is not arranged in a disturbing manner protruding into the process chamber.

To facilitate the sealing in a simple manner and avoid possible leaking between the extrudate collection member and the housing of a process chamber to the surrounding area in a reliable and simple manner, the process chamber can have a housing convexity according to a preferred embodiment being designed such that the extrudate collection member in the production position can be moved into the housing convexity. The outline of the housing convexity can correspond to the outline of the extrudate collection member such that only a small dead space is present.

To improve the extrudate discharge by means of the extrudate collection member during the start-up process, the at least one melt channel or the melt channels, respectively, can be rinsed via at least one correspondingly provided terminal with a rinsing fluid. The extrudates can be surrounded by the rinsing fluid, which prevents clogging of the at least one extrudate extraction channel in a particular reliable manner. This can also improve the extrudate discharge according to the present invention in a structurally simple manner. The at least one terminal for the rinsing fluid, thereby, can be provided in the region of the discharge outlet or the discharge outlets, respectively, of the at least one melting channel there in the extrudate collection member.

FIG. 1 depicts a diagrammatic sectional view of a part of an underwater granulation device comprising a device for avoiding the uncontrolled discharge of melt from a nozzle plate according to one or more embodiments.

An underwater granulation device is shown having a nozzle plate 2 with nozzle apertures 1*a* and 1*b* arranged therein. The extrudates normally exit the nozzle apparatuses and enter into a process chamber 3. A locking member formed as an extrudate collection member 4 is in a collection position in front of the nozzle plate 2.

The extrudate collection member 4 can be formed as a slider element, which is supported translatory, displaceable, and which also can be moved into the production position downwards and straight (as indicated in FIG. 1 by the arrow). The nozzle apertures 1*a* and 1*b* of the nozzle plate 2 can be exposed such that the extrudates discharged therethrough during production can be separated by a cutting device (not shown in the figures), and can be discharged by a cooling fluid provided in the process chamber 3.

The extrudate collection member 4 can have several melt extraction apertures 5*a* and 5*b* which are arranged in the extrudate collection member 4 such that they are aligned in the collection position shown to the nozzle apertures 1*a* and 1*b* in the nozzle plate 2. Further, the melt extraction apertures 5*a* and 5*b* respectively communicate with one or more extraction channels (extraction channels 6*a* and 6*b* are shown) in the extrudate collection member 4 whereby the extrudates can be discharged via a melt extraction channels 6*a* and 6*b* opened downwards. The extraction channels 6*a* and 6*b* can be rinsed with a rinsing fluid via its opening, shown in the lower area.

The extrudate collection member 4 is, on the one hand, sealed by means of sealing members 7*a*-7*e* formed as lip seals in the embodiments shown, for example made from polyimide, against the single nozzle apertures 1*a* and 1*b* of the nozzle plate 2 as well as against the process chamber 3. The extraction collection member 4 is supported displaceably by means of a cam channel 8 arranged in the housing of the process chamber 3 whereby only one cam channel 9 is shown, but on both sides of the extrudate collection member 4 respectively one corresponding cam channel 9 can be provided. In each cam channel 9, one or more cams (two are shown 10*a* and 10*b*) can be fixed at the top and bottom to the extrudate collection member 4, are supported movably whereby the cam channel 9 is arranged in regions in which the respective cams 10*a* and 10*b* is present when the extrudate collection member 4 is in the collection position. The cams 10*a* and 10*b* can be moved to cause engagement between the nozzle plate 2 and the collection member 4.

The process chamber 3 can have a housing convexity 8 which can be designed such that the extrudate collection member 4 in the production position is moved into the housing convexity 8.

The guidance of the extrudate collection member 4 results along a substantially straight movement direction, as is dictated by the cam channel 9 on both sides of the extrudate collection member 4. The location of the cams 10*a* and 10*b* in the collection position of the extrudate collection member 4, the respective cam channel 9 is arranged slightly displaced with respect to the nozzle plate 2.

Figure 2:
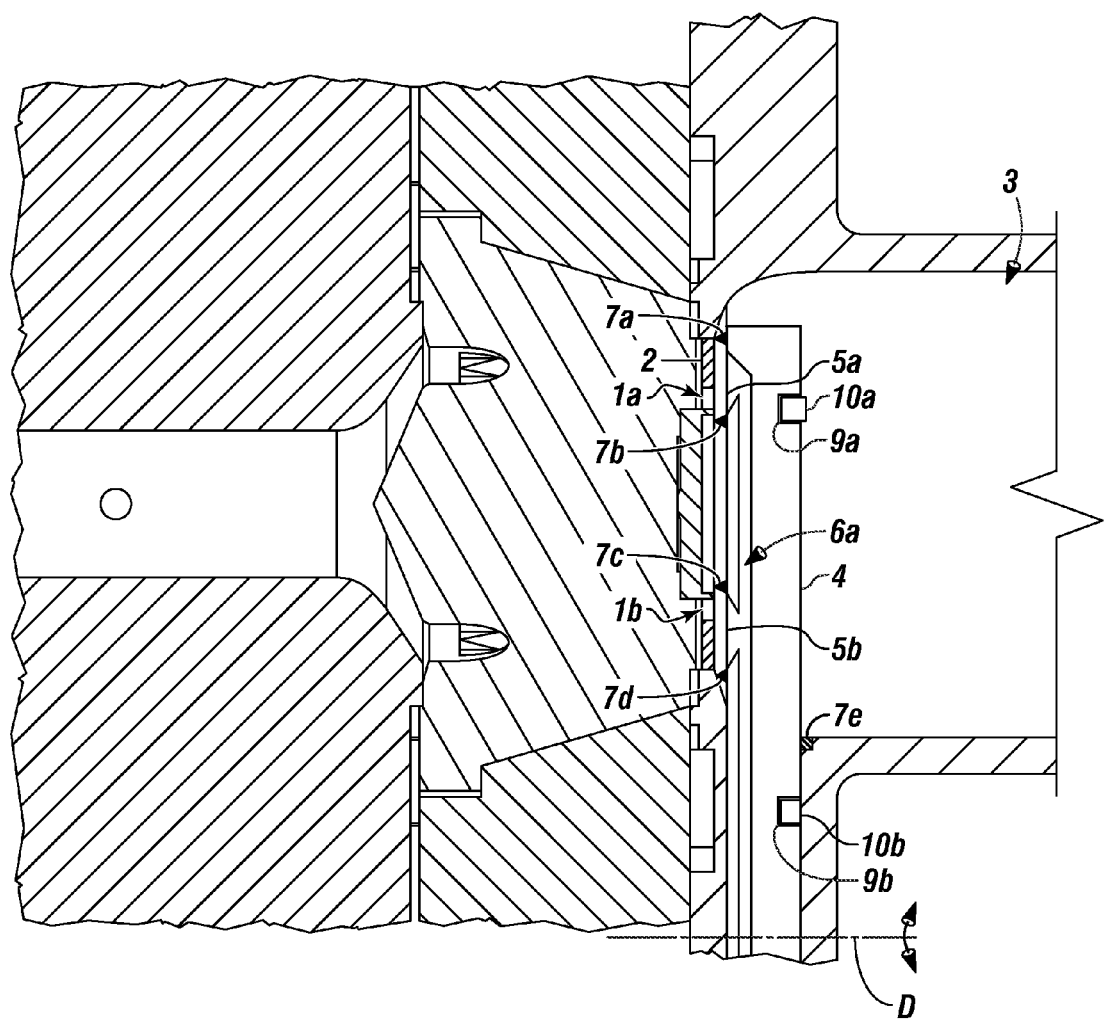
FIG. 2 depicts a diagrammatic sectional view of a part of an underwater granulation device with a device for avoiding the uncontrolled discharge of melt from a nozzle plate according to one or more embodiments.

FIG. 2 depicts a diagrammatic sectional view of a part of an underwater granulation device with a device for avoiding the uncontrolled discharge of melt from a nozzle plate according to one or more embodiments.

The extrudate collection member 4 can be a rotary element. And the extrudate collection member 4 can be supported pivotally around a rotation axis D. The cams 10*a* and 10*b* on the housing of the process chamber 3 and cam channels 9*a* and 9*b* in the region of the extrudate collection member 4 can provide corresponding guidance of the extrudate collection member 4.

The rotation axis D can be arranged in the boundary region of the process chamber 3 or the housing of the process chamber 3, respectively. The rotation axis D can run perpendicular to the plane of the nozzle plate 2 and the movement plane of the extrudate collection member 4. The sealing arrangement in FIG. 2 corresponds to the sealing arrangement in FIG. 1. The device in FIG. 2 is shown in the collection position. The arrangement of the melt extraction apertures 5*a* and 5*b*, the melt extraction channels 6*a* and 6*b*, and the sealing members 7*a*-7*e* in FIG. 2 correspond to the illustration of FIG. 1.

Figure 3A:
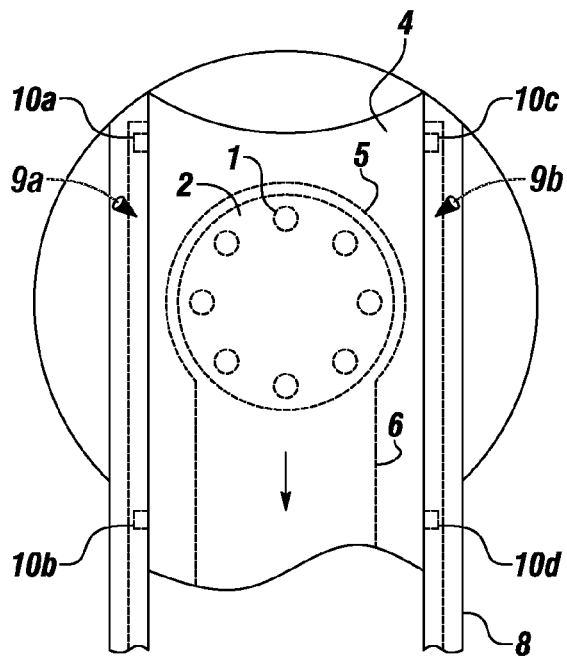
FIG. 3a depicts a diagrammatic top view of a device in a collection position according to one or more embodiments.
Figure 3B:
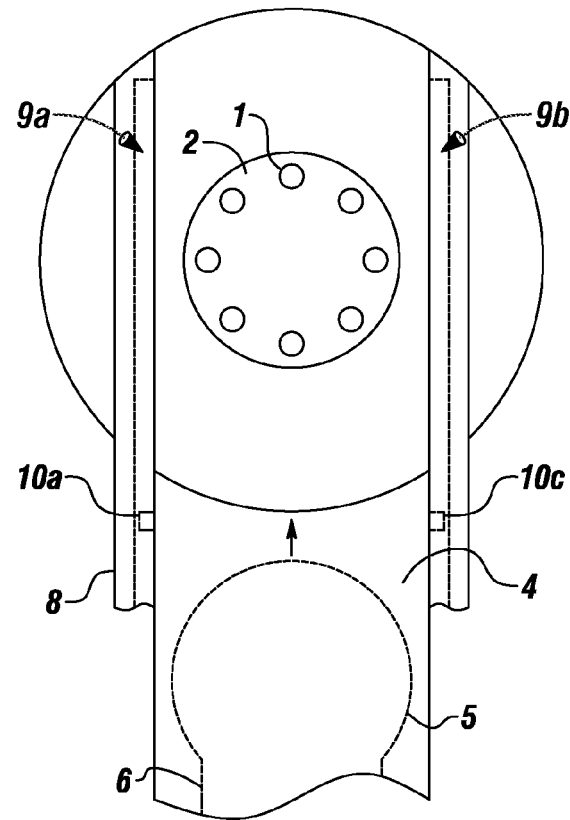
FIG. 3b shows a diagrammatic top view of the device of FIG. 3a in a production position according to one or more embodiments.

FIG. 3*a* depicts a diagrammatic top view of a device in a collection position according to one or more embodiments. FIG. 3*b* shows a diagrammatic top view of the device of FIG. 3*a* in a production position according to one or more embodiments.

Referring to FIGS. 3*a* and 3*b*, the first cam channel 9*a* on the left-hand side and the second cam channel 9*b* on the right-hand side of the extrudate collection member 4 are provided in the region of the housing of the process chamber 3. The extrudate collection member 4 can have four cams 10*a*-10*c* fixed spaced apart from each other by means of which a planar and uniform pressing pressure of the extrudate collection member 4 against the nozzle plate 2 can result.

A single melt extraction aperture 5 that has the entire number of nozzle apertures 1 in the nozzle plate 2 or surrounds the latter, respectively, and accordingly, also a single melt extraction channel 6 communicates with this consolidated melt extraction aperture 5. An enlarged cross-section of stream of the corresponding cavities in the extrudate collection member 4 can be which improves the discharge of the collected extrudates with the thus designed extrudate collection member 4. The discharge outlet of the extrudate collection member 4 can be provided downwards such that gravity can act supportively during extrudate discharge.

In FIG. 3*b*, the extrudate collection member 4 is pulled from the collection position shown in FIG. 3*a* into a production position. The extrudate collection member 4 can be located in a housing convexity 8 of the process chamber 3. The extrudate collection member 4 can have an outline designed such that the latter corresponds in the production position aerodynamically to the outline of the surrounding process chamber 3, and thus, seals the latter additionally.

Figure 4A:
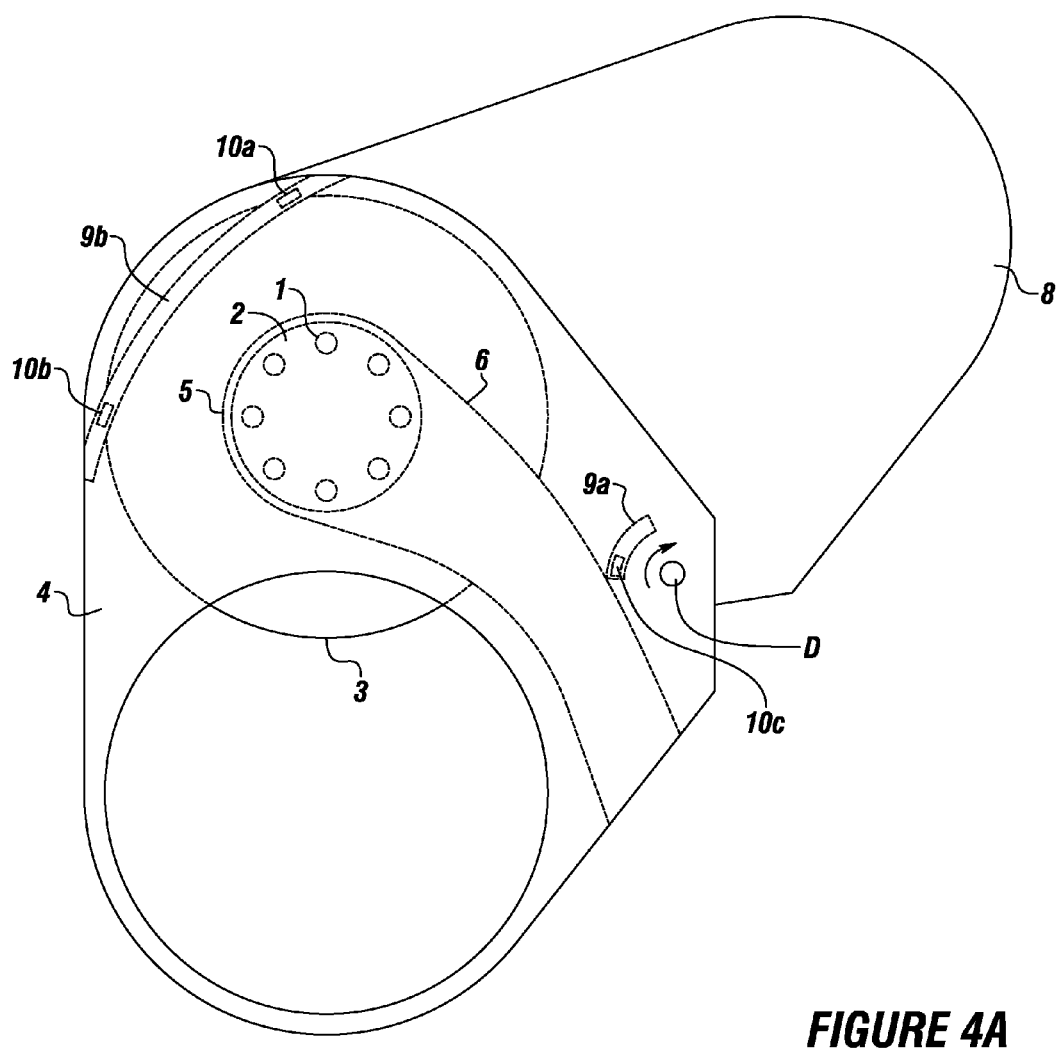
FIG. 4a depicts a diagrammatic top view on the device according to one or more embodiments in a collection position.

FIG. 4*a* depicts a diagrammatic top view on the device according to one or more embodiments in a collection position. FIG. 4*b* shows a diagrammatic top view on the device of FIG. 4*a* in a production position.

Referring to FIGS. 4*a* and 4*b*, the extrudate collection member 4 can include a common melt extraction aperture 5 and a common melt extraction channel 6. The common melt extraction channel can lead downwards. Two cam channels 9*a* and 9*b* are provided respectively in the upper and lower region of the extrudate collection member 4 whereby three cams 10*a*-10*c* are fixed to the process chamber 3 or the housing of the process chamber 3. The cams 10*a*-10*e* can be spaced apart from on another. The cams 10*a*-10*c* can provide a planar and uniform pressing pressure engaging the extrudate collection member 4 and the nozzle plate 2.

The extrudate collection member 4 can be supported pivotally in the region of the circumference of the housing of the process chamber 3. The extrudate collection member 4 can move about the pivot axis D. Also, the housing convexity 8 of the process chamber 3 can be seen, into which the extrudate collection member 4 is pivotable during pivoting into the production position, and which in its outline corresponds to the outline of the extrudate collection member 4. In this respect, see also FIG. 4b.

The extrudate collection member 4 of FIG. 4a is pivoted around the rotary axis D from the collection position shown there into the production position of FIG. 4b.

As shown in FIGS. 4a and 4b, the extrudate collection member 4 has an outline designed such that the latter at least in the production position corresponds to the outline of the surrounding process chamber, and, thereby, seals the latter additionally. The boundary region running around the corresponding opening of the outline of the extrudate collection member 4 of FIGS. 4a and 4b can seal the extrudate collection member 4 against the process chamber 3 or the housing of the process chamber 3, respectively, e.g. also by an additional arrangement of one or more annular sealing members there (not shown in FIGS. 4a and 4b).

The sealing members 7a-7e, as they are shown in FIG. 2, are not shown in FIGS. 4a and 4b.

The extrudate collection member 4 can be sealed in the collection position against the nozzle plate 2 as well as in the production position against the process chamber 3 or against the housing there, respectively.

While these embodiments have been described with emphasis on the embodiments, it should be understood that within the scope of the appended claims, the embodiments might be practiced other than as specifically described herein.

What is claimed is:

1. A device for avoiding the uncontrolled discharge of melt from nozzle apertures of a nozzle plate, wherein the device comprises:
   a. a locking member that is movable in front of the nozzle plate, wherein the locking member is formed as an extrudate collection member, wherein the locking member is reciprocable between a production position and a collection position, and wherein melt is discharged from the nozzle apertures of the nozzle plate in the form of extrudates into a process chamber when the locking member is in the production position and into extrudate collection member when the locking member is in the collection position; and
   b. a melt extraction aperture disposed on the extrudate collection member, wherein the melt extraction aperture is configured to align with the nozzle apertures in the nozzle plate and a melt extraction channel.

2. The device of claim 1, wherein the extrudate collection member is sealed by sealing members against the process chamber and the nozzle plate.

3. The device of claim 2, wherein the sealing members are lip seals.

4. The device of claim 1, wherein the extrudate collection member is formed as a slider element which is supported translatory displaceable.

5. The device of claim 1, wherein the extrudate collection member is formed as a rotary element which is supported pivotally around a rotary axis.

6. The device of claim 1, further comprising a cam, and a cam channel wherein the cam is movably supported in cam channel, wherein the cam channel is configured to allow the cam to press the collection member against the nozzle plate when in the collection position.

7. The device of claim 6, wherein the cam is fixed to the extrudate collection member, and that cam channel is located in the region of the process chamber.

8. The device of claim 6, wherein the in cam is fixed to the process chamber, and the cam channel is located in the region of the extrudate collection member.

9. The device of claim 1, further comprising two cam channels, and wherein each cam channel is provided with two cams supported movably in the respective cam channel.

10. The device of claim 1, wherein the extrudate collection member has an outline designed such that the latter in the production position corresponds to the outline of the surrounding process chamber, and thereby seals the latter.

11. The device of claim 10, wherein the process chamber has a housing convexity such that the extrudate collection member in the production position is moved into the housing convexity.

12. The device of claim 1, wherein the process chamber has a housing convexity such that the extrudate collection member in the production position is moved into the housing convexity.

13. The device of claim 12, wherein the at least one melt extraction channel is rinsable with a rinsing fluid.

14. The device of claim 1, wherein the at least one melt extraction channel is rinsable with a rinsing fluid.

* * * * *